W. Stephens,
Oscillating Steam Engine.
N° 10,121.    Patented Oct. 11 1853.
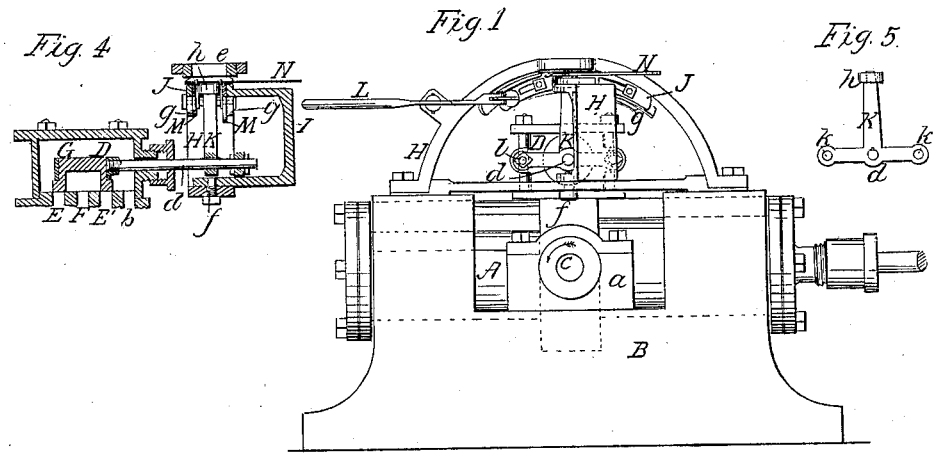
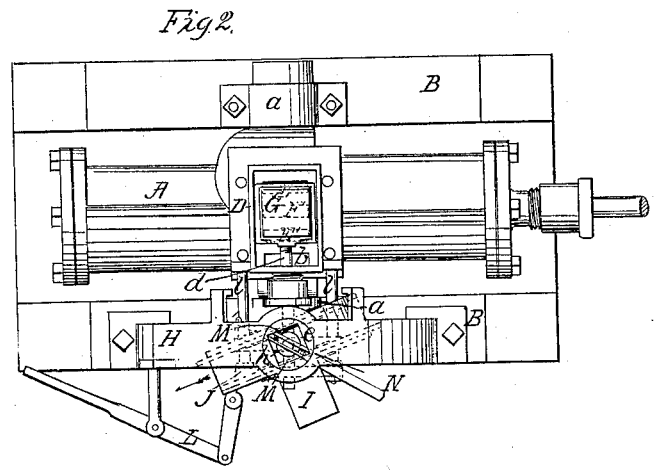
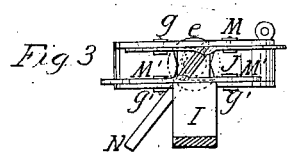

UNITED STATES PATENT OFFICE.

WILLIAM STEPHENS, OF PITTSTON, PENNSYLVANIA.

VALVE-MOTION OF OSCILLATING ENGINES.

Specification of Letters Patent No. 10,121, dated October 11, 1853.

*To all whom it may concern:*

Be it known that I, WILLIAM STEPHENS, of Pittston, in the county of Luzerne and State of Pennsylvania, have invented certain new and useful Improvements in Slide-Valve Motions of Oscillating Steam-Engines; and I do hereby declare that the following is a full, clear, and exact description of the same, reference being had to the accompanying drawings, making a part of this specification, in which—

Figure 1, is a side elevation of an oscillating steam-engine, having my improved valve motion. Fig. 2, is a plan of the same, with the cover of the valve-box removed. Fig. 3, is an inverted horizontal sectional view of the movable "way-frame." Fig. 4, is a transverse vertical section of the valve-box, valve, way-frame, and their appendages. Fig. 5, is a side view of the cross-head of the valve-rod.

Similar letters of reference indicate corresponding parts, in each of the several figures.

The valve motion which forms the subject of this invention produces the necessary movement of the slide valve by means of a fixed groove or guide, attached to some part of the engine frame, in a convenient position to receive a stud, attached to or connected with the valve rod; the said stud being caused to receive a proper motion by being carried along the groove or guide by the oscillation of the cylinder. Other valve motions have been used which operate the valve by similar means; but arranged and operating in a different manner to that now under consideration, which has been invented with a view to greater simplicity.

This invention consists:—

1st. In arranging the ports and valve so, that the latter shall work transversely on one side of the cylinder, as near as possible to its axis of oscillation, while the groove or guide is arranged in such a manner as to form a portion of a helix or screw which is concentric to the said axis, and includes the valve-rod,—and, in furnishing the said valve rod with an arm or stud which enters the said groove or guide, and thus transmits motion to the valve, as the cylinder oscillates. By this arrangement, the motion is transmitted directly to the valve, without the necessity of a way-shaft or other intermediate mechanism.

2nd. In lining the sides of the groove or guide with adjustable sliding pieces, of a certain form for giving the valve, a "lead" in whichever direction the engine is working.

To enable those skilled in the art to make and use my invention, I will proceed to describe the construction and operation of the same.

A, is the cylinder of the engine, which oscillates from the center of its length in bearings, $a$, $a$, supported on standards, B, B; it occupies, when on its center, a horizontal position.

D, is the valve-box, on the top of the cylinder, receiving steam through the opening, $b$, which communicates through the trunnion, $c$, with the steam pipe, (not shown.)

E, E', F, are the steam and exhaust ports, which, in the position of the engine shown in Figs. 1, 2, and 4, are all, except a small portion of the first referred to, covered by the short slide valve G, which is of the common construction, and has its rod, $d$, passing through a stuffing box, on one side of the valve-box.

H, is a frame of segmental form, secured to the standard, B, on that side of the engine, where the valve rod passes through the box: this frame has a hole bored in its upper circular part, to receive a hollow journal, $e$, at the top of the "way frame," I, which is an adjustable frame, containing the groove or guide which produces and directs the movement of the valve; the lower or straight part of the said frame receiving a screw stud, $f$, which forms a pivot, for the lower part of the way frame; the journal, $e$, and pivot, $f$, thus forming an axis, which is radial to the axis of oscillation of the cylinder. The way frame is a metal frame which may be of any convenient form, provided that one part forms an arc, J, described from the axis of the cylinder's oscillation; this arc has a groove or guide formed by strips, $g$, $g'$, projecting on its under side, which will be best seen in Fig. 3, for the purpose of receiving a friction roller, $h$, which turns freely on a pivot on the cross-head, K, secured to the valve rod; this cross head is in the form of an inverted letter T; the two eyes, $k$, $k$, fitting to two guide rods, $l$, $l$, which are so secured to the valve box, as to preserve the rectilinear motion of the rod.

The way-frame, I, is under the control of a lever, L, having its fulcrum fixed in the engine-frame, and can be adjusted on its axis, e, f, so as to bring the arc, J, at an inclination to the axis of the cylinder's oscillation either in the direction shown in Fig. 2, or in the opposite direction, as is indicated by a red line in the same figure, indicating its center line, or at right angles to the axis, when it would occupy the position of Fig. 3, relatively to Fig. 2. When the arc is in the latter position, the engine is stopped; as the oscillation of the cylinder gives no motion to the slide valve, which would be in position to close both steam ports; but when in either of the positions shown and indicated in Fig. 2, the groove or space between the strips, $l$, $l$, is similar to the recess in the thread of a screw, and as the cylinder oscillates, it gives motion to the valve; the two positions serving to actuate the valve for running the engine in both directions. The position of the arc, for giving the proper motion, is regulated by stops, $m$, $m$, on the frame, H, into contact with one of which the arc is moved.

M, M', are the adjustable sliding lining pieces of the guide in the arc, J; these consist of metal strips attached one to each of the strips $g$, $g'$, by bolts passing through slots, which allow them to be adjusted longitudinally. The strips are straight, except that each has a rounded rise, $n$, on its face, at about the center of its length; the two being connected by a lever, N, which works through a slot in the top of the way frame, and allows the two rising parts, $n$, to be brought on either side of the center point of the movement of the roller, $h$; one being always on the opposite side of the said center to the other, as shown in Figs. 2, and 3.

In the drawing, the cylinder is supposed to be oscillating in the direction of the arrow shown in Fig. 1; the piston just having arrived at the right hand end, and being about to commence its motion toward the left; the valve having a "lead," and the steam port, E, leading to the right hand end of the cylinder, being open, the "lead" of the valve is caused by the rise, $n$, on the lining piece, M, against which the roller works during the oscillation in this direction; the roller arriving at the foot of this rise, just before the engine is on the center, gives a suddenly increased speed to the valve at that point; so that it is slightly open before the termination of the stroke, and its arrival at the center of the distance it travels in the guide. In oscillating in the other direction, the roller works against the other lining-piece M', and the valve receives a "lead" on the opposite side, in a similar manner. The ascent and descent of each rise, $n$, are of the same form, and thus they will serve to give the "lead," in whichever direction the engine revolves; but when the position of the way-frame is changed, to reverse the engine, the position of the lining pieces also require to be changed, to bring the rising parts, $n$, of each, on a different side of the center of motion. This change of position is effected by moving the lever, N.

What I claim as my invention and desire to secure by Letters Patent, is,—

1. The combined arrangement of the slide valve and the guide, J, which assists the oscillation of the engine in producing, and directs the motion of the said valve, substantially as described, to wit, the valve being arranged to work transversely to the cylinder, and the guide being in the form of part of a helix or screw, concentric to the axis of the cylinder's oscillation, and receiving an arm or cross-head, attached directly to the rod or stem of the valve, whereby the intermediate mechanism usually employed is dispensed with.

2. Giving the valve the necessary or desired "lead," by means of the adjustable sliding lining pieces, M, M', which line the sides of the guide, and are furnished with projecting or rising parts, $n$, $n$, which will give the necessary "lead", in working the engine in either direction, as herein set forth.

WM. STEPHENS.

Witnesses:
F. L. JOHNSON,
JESSE WILLIAMS.